United States Patent [19]
Nagahara et al.

[11] Patent Number: 5,150,342
[45] Date of Patent: Sep. 22, 1992

[54] PHOTO-DETECTING DEVICE

[75] Inventors: Shinichi Nagahara; Naoharu Yanagawa; Takaaki Matsumoto, all of Saitama, Japan

[73] Assignee: Pioneer Electronic Corporation, Tokyo, Japan

[21] Appl. No.: 652,726

[22] Filed: Feb. 8, 1991

[30] Foreign Application Priority Data

Jun. 27, 1990 [JP] Japan ................... 2-166624

[51] Int. Cl.⁵ ............................................. G11B 7/00
[52] U.S. Cl. ........................... 369/44.14; 369/44.41; 369/44.42
[58] Field of Search ............... 369/44.41, 44.42, 44.14, 369/44.23, 44.11, 44.27, 44.28, 44.26, 44.32, 44.33; 250/201.5

[56] References Cited

U.S. PATENT DOCUMENTS

| | | | |
|---|---|---|---|
| T953,022 | 12/1976 | Firester | 369/44.41 |
| 4,425,043 | 1/1984 | van Rosmalen | 369/44.21 |
| 4,475,182 | 10/1984 | Hosaka | 369/44.41 |
| 4,866,688 | 9/1989 | Ohtake et al. | 369/44.28 |

FOREIGN PATENT DOCUMENTS

| | | | |
|---|---|---|---|
| 0269327 | 11/1988 | Japan | 369/44.42 |
| 0137130 | 5/1990 | Japan | 369/44.41 |

*Primary Examiner*—Roy N. Envall, Jr.
*Assistant Examiner*—Thang V. Tran
*Attorney, Agent, or Firm*—Sughrue, Mion, Zinn, Macpeak & Seas

[57] ABSTRACT

The light receiving element of the photo-detecting device of this invention has its light receiving area formed smaller than the diameter of a beam reflected from an optical information recorded disc. This makes it possible for the tracking error signal to be taken from a central area of the beam spot where the light intensity is high. This minimizes the dc offset caused by misalignment between the objective lens and the beam axis. The light receiving surface of the element is divided into at least four sections along a line at 45 degrees to the direction of tracking. A difference is taken between the light quantities received by two divided light receiving surfaces disposed perpendicular to the tracking direction. This differential signal allows adjustment to be made of an angle between the disc and the photo-detecting device in the direction perpendicular to the tracking direction.

5 Claims, 4 Drawing Sheets

PHOTO-DETECTING DEVICE

BACKGROUND OF THE INVENTION

The present invention relates to a photo-detecting device in which a concentrated laser beam is radiated against an information recorded surface of an optical information recorded disc such as optical digital video disc and optical digital audio disc and in which the reflected light from the disc is received by a light receiving element to recover information from the disc.

PRIOR ART

A prior art photo-detecting device and its light receiving element are shown in FIG. 5 and 6.

In FIG. 5, reference numeral 1 represents a laser light generator; 2 a collimating lens to transform the laser light generated by the laser light generator 1 into parallel rays; 3 a beam splitter to either pass or reflect the laser beam according to the vibration plane of linear polarization; 4 a quarter-wave plate to rotate the vibration plane of linear polarization; and 5 an objective lens to focus the laser beam on an information recorded surface 6 of the information recorded disc.

The laser light that has passed through these devices and is reflected from the information recorded surface 6 is collimated by the objective lens 5 to become parallel rays, whose vibration plane is further rotated by the quarter-wave plate, before entering the beam splitter 3.

The reflected laser beam, whose vibration plane of linear polarization is rotated 90 degrees with respect to that of the original laser beam generated by the laser light generator 1, is reflected by the beam splitter 3 and focused by a lens 7 on a light receiving element 8.

When the laser beam striking the information recorded surface 6 is correctly aligned with a pit on the surface, the beam will form a light spot on the light receiving element 8 such that dark areas of the spot on left and right divided surfaces 8a, 8b of the light receiving element 8 are symmetrical with each other, as shown shaded in FIG. 7.

If, however, the pit is deviated either left or right from the laser beam, i.e., when a tracking error occurs, the dark areas of the spot shift as shown in FIG. 8, resulting in a difference between the outputs of the left and right light receiving surfaces 8a and 8b. This output difference is used to adjust the laser beam to correct the tracking error.

In such a photo-detecting device, when the objective lens 5 is shifted $\Delta x$ from the light axis, as shown in FIG. 9, the amount of light detected at the light receiving surface 8b increases and that at the light receiving surface 8a decreases since the center of the beam has the highest light intensity.

As a result, in a tracking error curve of FIG. 10, a dc offset $\Delta a + \Delta b$ corresponding to a change in the amount of light received at the light receiving surfaces 8a, 8b, occurs producing a tracking error signal Te. In the figure, $\epsilon$ represents the amount of shift in the beam center position.

The similar phenomenon takes place when the information recorded surface 6 of the disc is tilted as shown in FIG. 11.

That is, when the information recorded surface 6 tilts $\Delta \theta$ with respect to the light axis, the beam center on the light receiving element 8 will shift $f \cdot 2\Delta\theta$, where f is the distance from the objective lens 5 to the information recorded surface 6. In the tracking error curve of FIG. 10, the dc offset equal to $\Delta a + \Delta b$ occurs also in this case. It is therefore necessary to correct these dc offsets.

SUMMARY OF THE INVENTION

The present invention has been accomplished with a view to overcoming the above drawback and its objective is to provide a photo-detecting device which is capable of minimizing a dc offset, detecting an inclination of the information recorded disc in the tangential direction by two light receiving surfaces disposed perpendicular to the direction of tracking, and preventing track crossing noise from leaking into an RF signal, a sum of the light quantities received at the two perpendicularly disposed light receiving surfaces.

To achieve the above objective, the photo-detecting device of this invention makes smaller than the diameter of a laser beam the light receiving area of the light receiving element that receives the laser beam reflected from the optical information recorded disc. The photo-detecting device also has the light receiving surface of the element divided into at least four sections along a line at an angle of 45 degrees to the direction of tracking.

PREFERRED EMBODIMENT OF THE INVENTION

One embodiment of this invention will be described by referring to the accompanying drawings.

Figure 1:
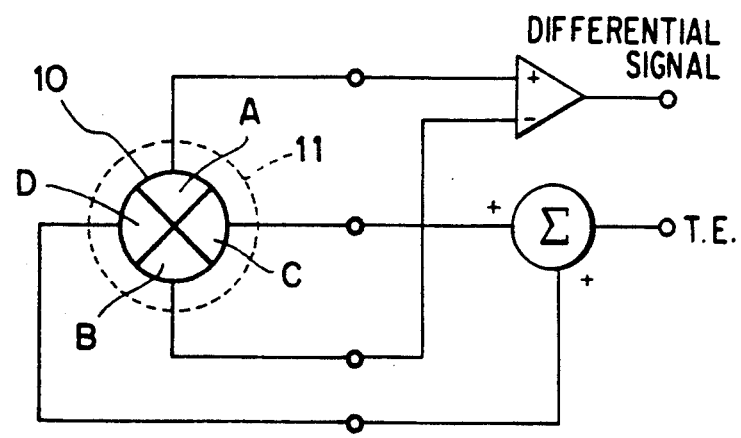
FIG. 1 is a schematic diagram showing the relationship between a light receiving element as one embodiment of this invention and a beam spot.

As shown in FIG. 1, a light receiving element 10 used in the photo-detecting device of this invention has its circular light receiving surface formed smaller than the diameter S of a beam spot 11 and divided into four sections A, B, C, D along a line at an angle of 45 degrees to the direction of tracking so as to derive outputs from each of the divided light receiving surfaces.

When the beam spot 11 shifts from the normal position of FIG. 1 toward the left to a position indicated by a solid line in FIG. 2 or toward the right to a position shown in FIG. 3, a change in the light quantity received by each of the divided light receiving surfaces will be as follows.

Figure 2:
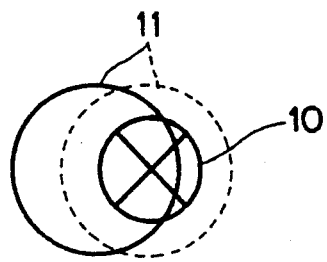
FIG. 2 and 3 show a beam spot deviated from the center of the light receiving element.
Figure 3:
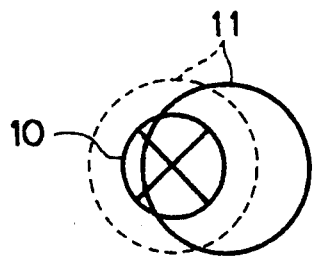

|            | Spot shifted from FIG. 1 to FIG. 2 | Spot at position of FIG. 1 | Spot shifted from FIG. 1 to FIG. 3 |
| --- | --- | --- | --- |
| Surface D  | $+\Delta d$         | No change | $-\Delta d$           |
| Surface C  | $-\Delta c$         | No change | $+\Delta c$           |
| D $-$ C    | $\Delta d + \Delta c$ | 0         | $-(\Delta d + \Delta c)$ |

The tracking error TE can be checked for its polarity and level by taking summation of the change $\Delta d$ in the light quantity at the light receiving surface D and the light quantity change $\Delta c$ at the surface C.

Figure 4:
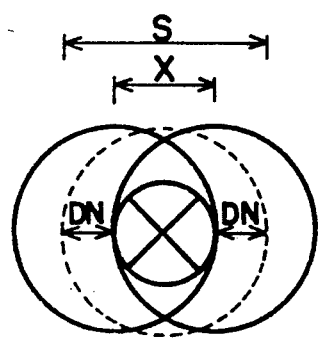
FIG. 4 is a schematic diagram showing the relative size of the light receiving element with respect to the beam spot.
Figure 5:
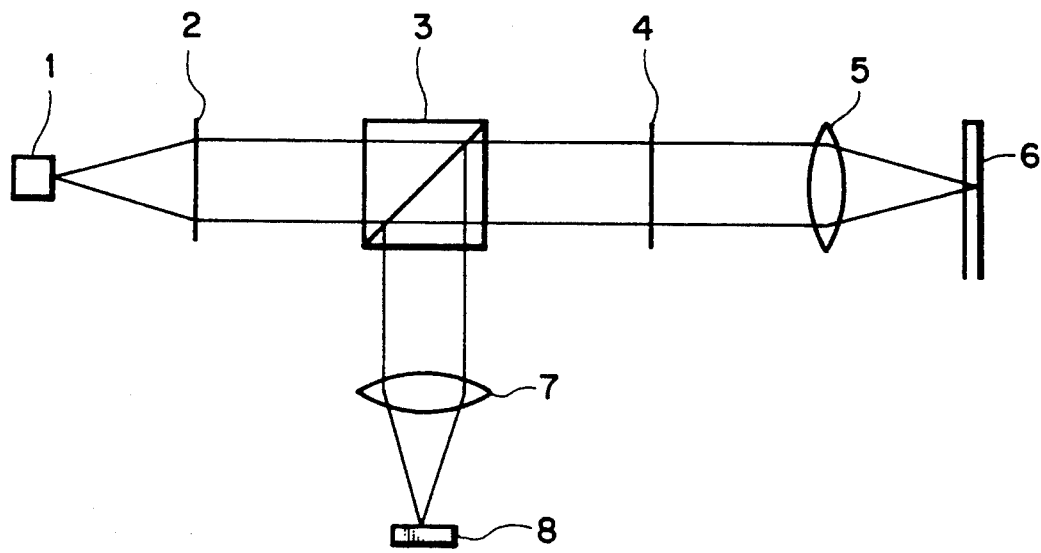
FIG. 5 is a schematic diagram showing the operation principle of the photo-detecting device.
Figure 6:
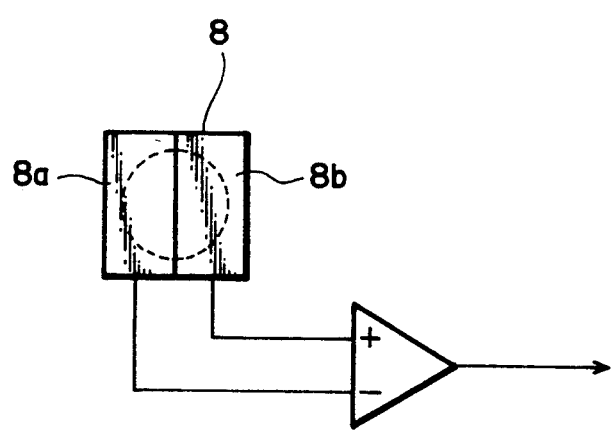
FIG. 6 is a front view of the light receiving surface.
Figure 7:
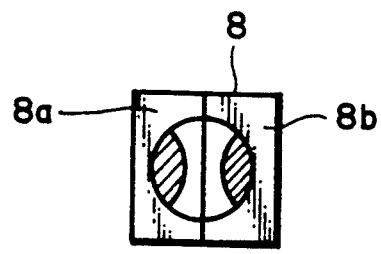
FIG. 7 is a front view of the light receiving surface and the beam spot when there is no tracking error.
Figure 8:
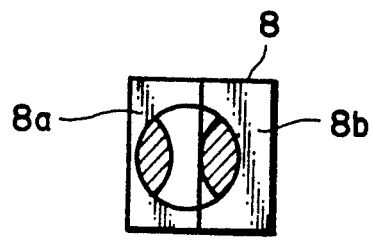
FIG. 8 is a front view of the light receiving surface and the beam spot when there is a tracking error.
Figure 9:
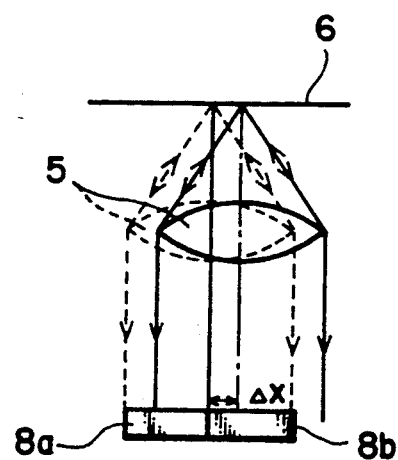
FIG. 9 is a schematic diagram showing the objective lens deviated from the beam axis.
Figure 10:
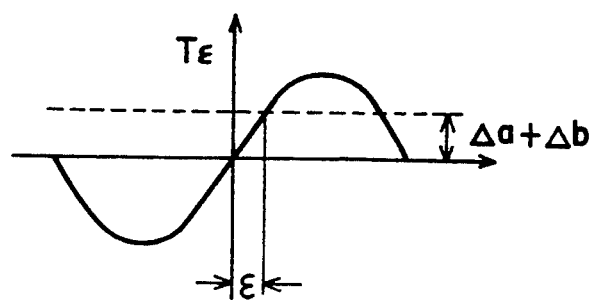
FIG. 10 is a graph of a tracking error signal.
Figure 11:
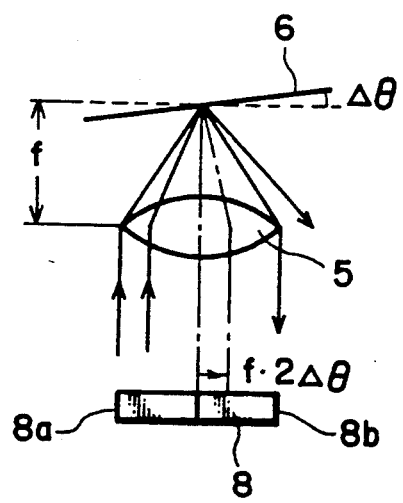
FIG. 11 is a schematic diagram showing the information recorded surface tilted with respect to the incident laser beam.

The diameter X of the light receiving element made up of the divided surfaces A, B, C, D is, as shown in FIG. 4, determined as $X = S - 2DN$ where S is the diameter of the beam spot 11, D is a tracking stroke of the objective lens and N is a magnifying power of the optical system. The tracking stroke of the objective lens D is the maximum allowable deviation of the information recorded disc as defined by the industrial standard. For the deviation D of the information recorded disc, the objective lens moves the beam spot 11 to left or right by the distance DN on the same plane of the light receiving surface.

The distribution of light intensity of semiconductor beam spot conforms to the Gaussian distribution, so that the central part of the beam has the highest intensity. With the light receiving surface configured as mentioned earlier, the dc offset caused by the misalignment between the objective lens and the beam axis becomes negligibly small. Setting the light receiving surface small also removes crosstalk components that would otherwise come from the adjacent tracks.

A differential signal representing a difference between the light quantities received by the divided light receiving surfaces A and B detects an inclination of the information recorded disc in the tangential direction. An RF signal, the sum signal of A and B, can be taken from the central portion of the beam spot or of the Gaussian distribution of light intensity where the major part of the light quantity is received While the above embodiment takes the example case of dividing the light receiving surface into four sections along a line at 45 degrees to the tracking direction, it is also possible to divide it into eight sections perpendicularly or parallelly with respect to the direction of tracking and provide the similar effect As mentioned above, since the light receiving surface is made smaller than the diameter of the beam spot, the tracking error signal is detected from the central portion of the Gaussian distribution of light intensity where the major part of the light quantity of the beam spot is received. This minimizes the dc offset caused by misalignment of the objective lens with respect to the beam axis.

A difference is taken between the received light quantities on the two light receiving surfaces disposed perpendicular to the tracking direction, i.e. in a direction not related to the detection of tracking error, in order to detect any inclination of the light receiving surface in the tangential direction. This allows a correct adjustment to be made of the relative angle between the information recorded disc and the photo-detecting device.

Another advantage of this invention is that the RF signal, a sum of the light quantities of the light receiving surfaces arranged perpendicular to the tracking direction, does not contain the track crossing noise.

What is claimed is:

1. A photo-detecting device comprising a light receiving element for receiving a laser beam reflected from an optical information recorded disc via an objective lens, wherein a diameter of a light receiving area of said light detecting element is made smaller than that of the laser beam, said light receiving area being divided into at least four segments by dividing lines radially extending from the center thereof, said dividing lines forming 45 degree angles with a tracking direction of the laser beam, said dividing lines forming first and second diametrically opposite segments along a diameter perpendicular to the tracking direction, and forming third and fourth diametrically opposite segments along a diameter parallel to the tracking direction each of said segments being connected to respective output terminals.

2. A photo-detecting device as claimed in claim 1, wherein the diameter X of said light receiving area is determined as $X = S - 2DN$, where S is the diameter of the laser beam, D is a tracking stroke of the objective lens, and N is a magnified power of said lens.

3. A photo-detecting device as claimed in claim 1, wherein polarity and level of a tracking error can be detected by summing the changes in the light quantities received at the third and fourth segments disposed parallel to the tracking direction, and an inclination of the information recorded disc in a tangential direction is detected by subtracting the changes in the light quantities received at the first and second segments disposed perpendicular to the tracking direction.

4. A photo-detecting device as claimed in claim 1, wherein output signals from said first and second segments are summed to generate an RF signal.

5. A photo-detecting device as claimed in claim 1, wherein a summation of a change in output signals from the third and fourth segments is used to eliminate a dc offset from a tracking error signal, said offset resulting from shifts in the objective lens position and tilting of the recorded disc.

* * * * *